(12) United States Patent
Fortuna et al.

(10) Patent No.: US 11,579,839 B1
(45) Date of Patent: Feb. 14, 2023

(54) AUDIO ANALYTICS AND ACCESSIBILITY ACROSS APPLICATIONS AND PLATFORMS

(71) Applicant: Sony Interactive Entertainment LLC, San Mateo, CA (US)

(72) Inventors: Ellana Fortuna, San Mateo, CA (US); Sarah Karp, San Mateo, CA (US); Elizabeth Juenger, San Mateo, CA (US)

(73) Assignee: SONY INTERACTIVE ENTERTAINMENT LLC, San Mateo, CA (US)

( * ) Notice: Subject to any disclaimer, the term of this patent is extended or adjusted under 35 U.S.C. 154(b) by 0 days.

(21) Appl. No.: 17/462,757

(22) Filed: Aug. 31, 2021

(51) Int. Cl.
*G06F 15/16* (2006.01)
*G06F 3/16* (2006.01)
*H04L 67/306* (2022.01)

(52) U.S. Cl.
CPC ............ *G06F 3/165* (2013.01); *H04L 67/306* (2013.01)

(58) Field of Classification Search
None
See application file for complete search history.

(56) References Cited

U.S. PATENT DOCUMENTS

2018/0277133 A1\* 9/2018 Deetz ................. G10L 21/0364

\* cited by examiner

*Primary Examiner* — Wing F Chan
*Assistant Examiner* — Andrew Woo
(74) *Attorney, Agent, or Firm* — Polsinelli LLP

(57) ABSTRACT

Systems and methods for audio analytics and audio-based accessibility are provided. A user audio profile may be stored in memory for a user. The user audio profile may include a custom prioritization of one or more audio parameters associated with one or more audio modifications. Audio streams associated with a user device of the user may be monitored based on the user audio profile during a current session. The audio parameters may be detected as being present in the monitored audio streams, and the detected audio parameters may be prioritized based on the custom prioritization of the user audio profile. A sound property of at least one of the audio streams may be modified in real-time based on the prioritization of the detected audio parameters by applying the audio modifications of the user audio profile to the at least one audio stream before the at least one audio stream is provided to the user device.

15 Claims, 5 Drawing Sheets

AUDIO ANALYTICS AND ACCESSIBILITY ACROSS APPLICATIONS AND PLATFORMS

BACKGROUND OF THE INVENTION

1. Field of the Invention

The present invention generally relates to audio analytics. More specifically, the present invention relates to audio analytics and audio-based accessibility across application and platforms.

2. Description of the Related Art

Presently available digital content may include audio-visual and other types of data. Interacting with various titles of such digital content may therefore involve using a device to present such audio-visual and other data in a digital environment. For example, playing an interactive game title may involve presenting a variety of different audio-visual effects within an associated virtual environment. The audio-visual effects may include soundtracks, scores, background noise associated with the virtual (e.g., in-game) environment, sounds associated with virtual characters and objects, etc. During a gameplay session of the interactive game title, multiple different types of audio may be presented simultaneously. For example, an in-game scene may be associated with a musical score, environmental sounds associated with the specific location in the virtual environment, and one or more virtual characters and objects speaking or otherwise making noise. Different users may find such combinations of sounds confusing, distracting, unpleasant, or otherwise undesirable.

In addition, many users may enjoy playing such digital content titles in social settings that allow for concurrent interactions with other users (e.g., friends, teammates, competitors, spectators). Such social interaction—which may include voice chat or video chat—may take place on one or more different platforms (e.g., game platform server, lobby server, chat server, other service provider). Thus, the user may be presented with additional audio streams to try to decipher and comprehend at the same time the content-related audio discussed above. Moreover, such combinations of sounds may also drown out the user's ability to hear what is happening in the real-world environment. Some users—particularly those with hearing-loss or other conditions and disabilities affecting hearing and cognition—may find such situations difficult to navigate, thereby adversely affecting their enjoyment and experience with the interactive game title.

There is, therefore, a need in the art for improved systems and methods of audio analytics and audio-based accessibility across application and platforms.

SUMMARY OF THE CLAIMED INVENTION

Embodiments of the present invention include systems and methods for audio analytics and audio-based accessibility across application and platforms. A user audio profile may be stored in memory for a user. The user audio profile may include a custom prioritization of one or more audio parameters associated with one or more audio modifications. Audio streams associated with a user device of the user may be monitored based on the user audio profile during a current session. The audio parameters may be detected as being present in the monitored audio streams, and the detected audio parameters may be prioritized based on the custom prioritization of the user audio profile. A sound property of at least one of the audio streams may be modified in real-time based on the prioritization of the detected audio parameters by applying the audio modifications of the user audio profile to the at least one audio stream before the at least one audio stream is provided to the user device.

DETAILED DESCRIPTION

Embodiments of the present invention include systems and methods for audio analytics and audio-based accessibility across application and platforms. A user audio profile may be stored in memory for a user. The user audio profile may include a custom prioritization of one or more audio parameters associated with one or more audio modifications. Audio streams associated with a user device of the user may be monitored based on the user audio profile during a current session. The audio parameters may be detected as being present in the monitored audio streams, and the detected audio parameters may be prioritized based on the custom prioritization of the user audio profile. A sound property of at least one of the audio streams may be modified in real-time based on the prioritization of the detected audio parameters by applying the audio modifications of the user audio profile to the at least one audio stream before the at least one audio stream is provided to the user device.

Figure 1:
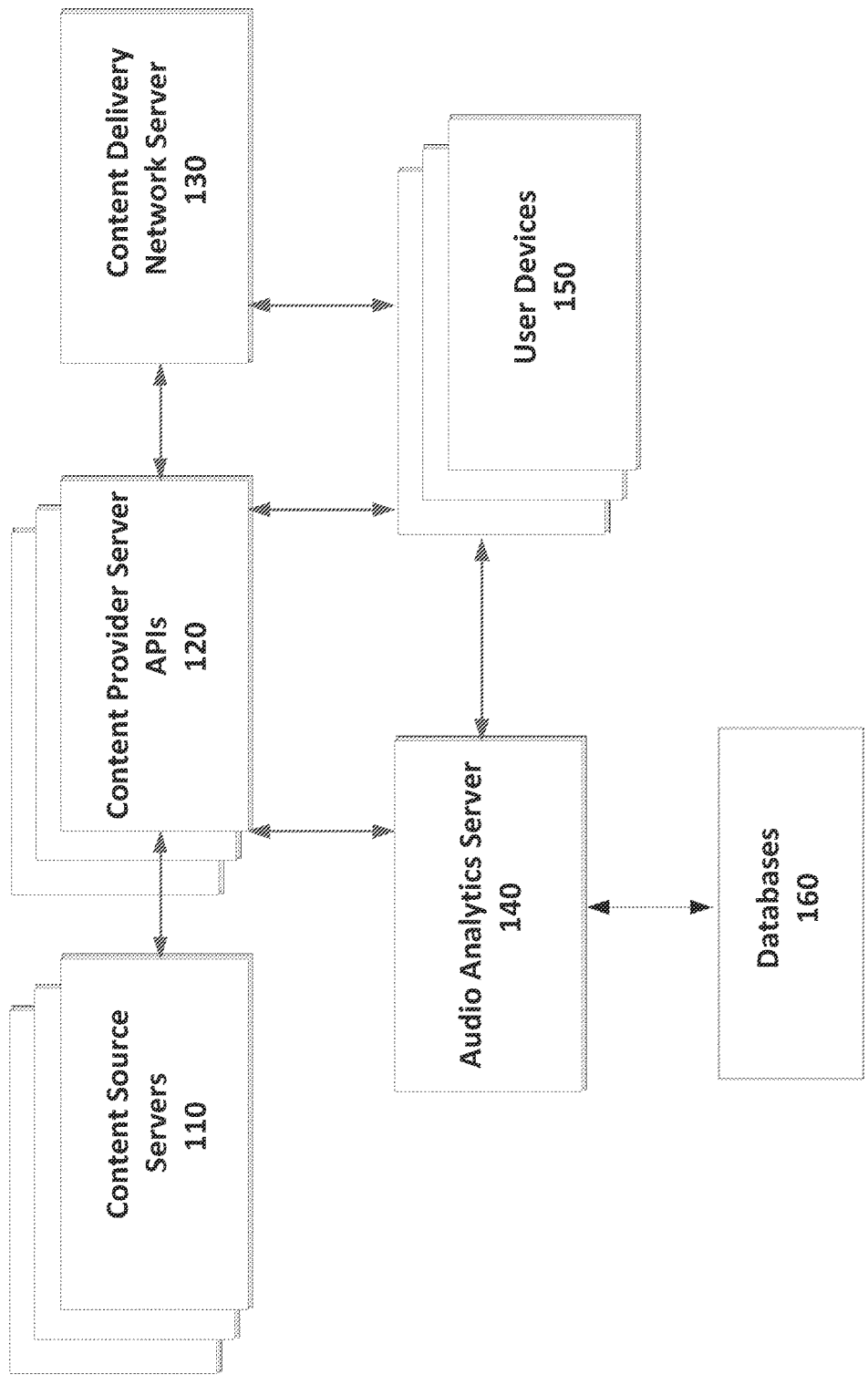
FIG. 1 illustrates a network environment in which a system for audio analytics and audio-based accessibility may be implemented.

FIG. 1 illustrates a network environment 100 in which a system for audio analytics and audio-based accessibility may be implemented. The network environment 100 may include one or more content source servers 110 that provide digital content (e.g., games, other applications and services) for distribution, one or more content provider server application program interfaces (APIs) 120, content delivery network server 130, audio analytics server 140, and one or more user devices 150. The devices in network environment 100 communicate with each other using one or more communication networks, which may include a local, proprietary network (e.g., an intranet) and/or may be a part of a larger wide-area network. The communications networks may be a local area network (LAN), which may be communicatively coupled to a wide area network (WAN) such as the Internet. The Internet is a broad network of interconnected computers and servers allowing for the transmission and exchange of Internet Protocol (IP) data between users connected through a network service provider. Examples of network service providers are the public switched telephone network, a cable service provider, a provider of digital subscriber line (DSL) services, or a satellite service provider. One or more communications networks allow for communication between the various components of network environment 100.

The servers described herein may include any type of server as is known in the art, including standard hardware computing components such as network and media interfaces, non-transitory computer-readable storage (memory), and processors for executing instructions or accessing information that may be stored in memory. The functionalities of multiple servers may be integrated into a single server. Any of the aforementioned servers (or an integrated server) may take on certain client-side, cache, or proxy server characteristics. These characteristics may depend on the particular network placement of the server or certain configurations of the server.

Content source servers 110 may maintain and provide a variety of digital content and digital services available for distribution over a communication network. The content source servers 110 may be associated with any content provider that makes its content available for access over a communication network. The content source servers 110 may therefore host a variety of different content titles, which may further have be associated with object data regarding a digital or virtual object (e.g., activity information, zone information, character information, player information, other game media information, etc.) displayed in a digital or virtual environment during an interactive session.

Such content may include not only digital video and games, but also other types of digital applications and services. Such applications and services may include any variety of different digital content and functionalities that may be provided to user devices 150, including providing and supporting chat and other communication channels. The chat and communication services may be inclusive of voice-based, text-based, and video-based messages. Thus, a user device 150 may participate in a gameplay session concurrent with one or more communication sessions, and the gameplay and communication sessions may be hosted on one or more of the content source servers 110.

The content from content source server 110 may be provided through a content provider server API 120, which allows various types of content source servers 110 to communicate with other servers in the network environment 100 (e.g., user devices 150). The content provider server API 120 may be specific to the particular operating language, system, platform, protocols, etc., of the content source server 110 providing the content, as well as the user devices 150 and other devices of network environment 100. In a network environment 100 that includes multiple different types of content source servers 110, there may likewise be a corresponding number of content provider server APIs 120 that allow for various formatting, conversion, and other cross-device and cross-platform communication processes for providing content and other services to different user devices 150, which may each respectively use different operating systems, protocols, etc., to process such content. As such, applications and services in different formats may be made available so as to be compatible with a variety of different user device 150. In a network environment 100 that includes multiple different types of content source servers 110, content delivery network servers 130, translation filter server 140, user devices 150, and databases 160, there may likewise be a corresponding number of APIs managed by content provider server APIs 120.

The content provider server API 120 may further facilitate access of each of the user devices 150 to the content hosted or services provided by the content source servers 110, either directly or via content delivery network server 130. Additional information, such as metadata, about the accessed content or service can also be provided by the content provider server API 120 to the user device 150. As described below, the additional information (e.g., object data, metadata) can be usable to provide details about the content or service being provided to the user device 150. In some embodiments, the services provided from the content source servers 110 to the user device 150 via the content provider server API 120 may include supporting services that are associated with other content or services, such as chat services, ratings, and profiles that are associated with a particular game, team, community, etc. In such cases, the content source servers 110 may also communicate with each other via the content provider server API 120.

The content delivery network server 130 may include a server that provides resources, files, etc., related to the content from content source servers 110, including various content and service configurations, to user devices 150. The content delivery network server 130 can also be called upon by the user devices 150 that request to access specific content or services. Content delivery network server 130 may include universe management servers, game servers, streaming media servers, servers hosting downloadable content, and other content delivery servers known in the art.

Audio analytics server 140 may include any data server known in the art that is capable of communicating with the different content source servers 110, content provider server APIs 120, content delivery network server 130, user devices 150, and databases 160. Such audio analytics server 140 may be implemented on one or more cloud servers that carry out instructions associated with interactive content (e.g., games, activities, video, podcasts, User Generated Content ("UGC"), publisher content, etc.). The audio analytics servers 140 may further carry out instructions, for example, for monitoring one or more audio streams based on a user audio profile. Specifically, the audio analytics server 140 may monitor for one or more audio parameters as specified by the user audio profile. When the audio parameters are detected, the audio analytics server 140 may prioritize such audio parameters in accordance with the custom prioritization specified by the user audio profile and modify at least one of the audio streams based on the prioritization.

The user device 150 may include a plurality of different types of computing devices. The user device 150 may be a server that provides an internal service (e.g., to other servers) in network environment 100. In such cases, user device 150 may correspond to one of the content servers 110 described herein. Alternatively, the user device 150 may be a computing device that may include any number of different gaming consoles, mobile devices, laptops, and desktops. Such user devices 150 may also be configured to access data from other storage media, such as, but not limited to memory cards or disk drives as may be appropriate in the case of downloaded services. Such user devices 150 may include standard hardware computing components such as, but not limited to network and media interfaces, non-transitory computer-readable storage (memory), and processors for executing instructions that may be stored in memory. These user devices 150 may also run using a variety of different operating systems (e.g., iOS, Android), applications or computing languages (e.g., C++, JavaScript). An exemplary client device 150 is described in detail herein with respect to FIG. 5. Each user device 150 may be associated with participants (e.g., players) or other types (e.g., spectators) of users in relation to a collection of digital content streams.

While pictured separately, the databases 160 may be stored on any of the servers and devices illustrated in network environment 100 on the same server, on different servers, or on any of the user devices 150. Such databases 160 may store or link to various sources and services used for audio analytics and modifications. In addition, databases 160 may store user audio profiles, as well as audio analytics models that may be specific to a particular user, user group or team, user category, game title, game genre, sound types, etc. The models may be used to identify specific speaking voices (e.g., of the user, of specific other users), which may serve as an audio parameter that may be prioritized and subject to audio modifications. One or more user audio profiles may also be stored in the databases 160 for each user. In addition to gameplay data regarding the user (e.g., user progress in an activity and/or media content title, user ID, user game characters, etc.), the user audio profile may include a set of audio parameters specified or adopted by the user in a custom prioritization scheme.

For example, certain users with hearing loss may find distinguishing among multiple different types of sounds to be difficult. In the context of a movie or game, the inability to comprehend speech (e.g., within the movie, game, or from other players in the current game session) may represent an accessibility barrier that prevents the user from gaining a full understanding of session events. Such a user may specify that spoken dialogue be prioritized over other types of sounds (e.g., background noise, environmental (real-world or virtual) noise, musical score or background music). Such prioritization may further be associated with audio modifications in which streams (and associated audio parameters) that are more highly prioritized are boosted relative to other concurrent streams (and associated audio parameters) that are less highly prioritized.

In addition to type of sound, other audio parameters may include specific user voices, number of user voices speaking at the same time, associated location (e.g., in-game or real-world), total and individual stream volume, frequency response (e.g., pitch), speed, and other detectable or measurable audio parameters known in the art. For example, a user may wish to prioritize hearing from their teammates or opponents with whom they may be playing during the session over hearing from non-playing friends or other spectators. The user may be a spectator and wish to prioritize hearing from certain players that they follow over other players that they do not follow. Different hearing preferences (e.g., frequency response ranges, speed ranges, volume ranges) may also be specified by the user and stored in the user audio profile for reference in applying to incoming audio streams. The preferences may be applied to the combination of streams, individual streams, and/or specific sounds/speech within the streams.

The location of the audio may also be associated with prioritization. For example, real-world audio arising from the real-world environment of the user may be prioritized. An associated audio modification may include increasing a level of noise transparency associated with other audio (e.g., in-game audio, online chat audio) and/or boosting the real-world audio. Thus, even if the user may be absorbed with gameplay or online chat, the user may nevertheless be able to clearly hear the real-world audio. The real-world audio may be captured by a microphone associated with the user device and provided to audio analytics server 140 for analysis and processing.

The microphone may also be used to capture data regarding speech by the user. The speech by the user may also be analyzed by audio analytics server 140 in accordance with the user audio profile. In some instances, the user may wish to apply modifications to their own voice to one or more audiences. Different modifications may be applied to different streams. For example, the user's voice may be modified one way in association with one stream (e.g., modified to sound like an in-game character's voice associated with a game title being played in the current session), while being modified in a different way in association with another stream (e.g., modified to lower frequency response, increase or decrease volume, slow down speed, modified to sound like the voice of a favorite character, celebrity, etc.).

Different prioritization schemes may also be specified depending on the specific content title, content type, (e.g., movie versus game), peer groups (e.g., friends, teammates, competitors, spectators), channels or platforms (e.g., in-game chat, external chat services such as Discord), and other characteristics of the session. In a given session, a user—via one or more user devices—may receive multiple different audio streams. The audio analytics and modifications described herein may apply to the whole combination of audio streams or to one or more of the audio streams as designated by the user. In some implementations, the user may designate all incoming audio streams, which may each be associated with different sources, channels, or platforms. Audio analytics server 140 may serve as an intermediary device that modifies one or more of the audio streams before delivering the streams to the user device(s). Alternatively, audio analytics server 140 may operate in conjunction with one or more local applications to provide audio-related insights and modifications for the user device(s) and local application(s) to apply.

Different combinations of the audio parameters (and associated audio modifications) may be stored in the user audio profile for each user. Collectively, therefore, the user language profile provides for custom audio modification settings for the specific user. The customization may further be based on current session conditions (e.g., current gameplay status, current game title, current in-game conditions). Because the audio streams are personalized by the audio analytics server 140 to the specific user based on their respective user audio profile, a session involving multiple different users may be modified to result in as many different versions of the audio stream(s) as there are users. In some embodiments, audio analytics server 140 may generate customized bots programmed to apply the custom user audio profile for a user to online communication sessions with which the user is participating via their respective user device.

In an exemplary embodiment, a user audio profile may be stored in memory for a user. The user audio profile may include a custom prioritization of one or more audio parameters associated with one or more audio modifications. Audio streams associated with a user device of the user may be monitored based on the user audio profile during a current session. The audio parameters may be detected as being present in the monitored audio streams, and the detected audio parameters may be prioritized based on the custom prioritization of the user audio profile. A sound property of at least one of the audio streams may be modified in real-time based on the prioritization of the detected audio parameters by applying the audio modifications of the user audio profile to the at least one audio stream before the at least one audio stream is provided to the user device.

Figure 2:
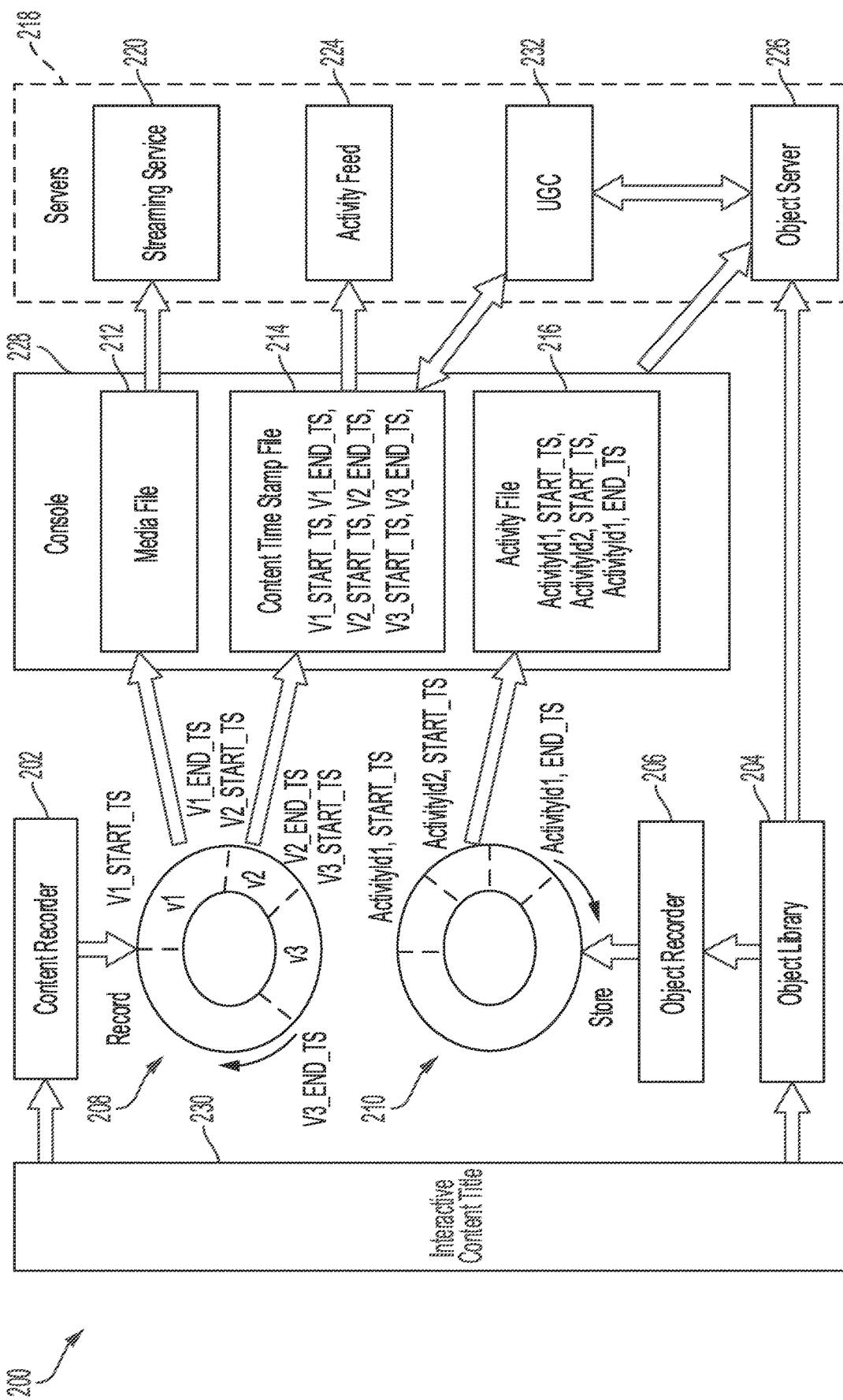
FIG. 2 illustrates an exemplary uniform data system (UDS) that may be used to provide data to a system for audio analytics and audio-based accessibility.

FIG. 2 illustrates an exemplary uniform data system (UDS) 200 that may be used to provide data to a system for audio analytics and audio-based accessibility. Based on data provided by UDS 200, translation filter server 140 can be made aware of the current session conditions, e.g., what in-game objects, entities, activities, and events that users have engaged with, and thus support analysis of and coordination of translation and filtration by translation filter server 140 with current gameplay and in-game activities. Each user interaction may be associated the metadata for the type of in-game interaction, location within the in-game environment, and point in time within an in-game timeline, as well as other players, objects, entities, etc., involved. Thus, metadata can be tracked for any of the variety of user interactions that can occur in during a game session, including associated activities, entities, settings, outcomes, actions, effects, locations, and character stats. Such data may further be aggregated, applied to data models, and subject to analytics. Such a UDS data model may be used to assign contextual information to each portion of information in a unified way across games.

For example, various content titles may depict one or more objects (e.g., involved in in-game activities) with which a user can interact and/or UGC (e.g., screen shots, videos, commentary, mashups, etc.) created by peers, publishers of the media content titles and/or third party publishers. Such UGC may include metadata by which to search for such UGC. Such UGC may also include information about the media and/or peer. Such peer information may be derived from data gathered during peer interaction with an object of an interactive content title (e.g., a video game, interactive book, etc.) and may be "bound" to and stored with the UGC. Such binding enhances UGC as the UGC may deep link (e.g., directly launch) to an object, may provide for information about an object and/or a peer of the UGC, and/or may allow a user to interact with the UGC.

As illustrated in FIG. 2, an exemplary console 228 (e.g., a user device 130) and exemplary servers 218 (e.g., streaming server 220, an activity feed server 224, an user-generated content (UGC) server 232, and an object server 226) are shown. In one example, the console 228 may be implemented on the platform server 120, a cloud server, or on any of the servers 218. In an exemplary example, a content recorder 202 may be implemented on the platform server 120, a cloud server, or on any of the servers 218. Such content recorder 202 receives and records content (e.g., media) from an interactive content title 230 onto a content ring-buffer 208. Such ring-buffer 208 may store multiple content segments (e.g., v1, v2 and v3), start times for each segment (e.g., V1_START_TS, V2_START_TS, V3_START_TS), and end times for each segment (e.g., V1_END_TS, V2_END_TS, V3_END_TS). Such segments may be stored as a media file 212 (e.g., MP4, WebM, etc.) by the console 228. Such media file 212 may be uploaded to the streaming server 220 for storage and subsequent streaming or use, though the media file 212 may be stored on any server, a cloud server, any console 228, or any user device 130. Such start times and end times for each segment may be stored as a content time stamp file 214 by the console 228. Such content time stamp file 214 may also include a streaming ID, which matches a streaming ID of the media file 212, thereby associating the content time stamp file 214 to the media file 212. Such content time stamp file 214 may be uploaded and stored to the activity feed server 224 and/or the UGC server 232, though the content time stamp file 214 may be stored on any server, a cloud server, any console 228, or any user device 130.

Concurrent to the content recorder 202 receiving and recording content from the interactive content title 230, an object library 204 receives data from the interactive content title 230, and an object recorder 206 tracks the data to determine when an object beings and ends. The object library 204 and the object recorder 206 may be implemented on the platform server 120, a cloud server, or on any of the servers 218. When the object recorder 206 detects an object beginning, the object recorder 206 receives object data (e.g., if the object were an activity, user interaction with the activity, activity ID, activity start times, activity end times, activity results, activity types, etc.) from the object library 204 and records the activity data onto an object ring-buffer 210 (e.g., ActivityID1, START_TS; ActivityID2, START_TS; ActivityID3, START_TS). Such activity data recorded onto the object ring-buffer 210 may be stored in the object file 216. Such object file 216 may also include activity start times, activity end times, an activity ID, activity results, activity types (e.g., competitive match, quest, task, etc.), user or peer data related to the activity. For example, an object file 216 may store data regarding an item used during the activity. Such object file 216 may be stored on the object server 226, though the object file 216 may be stored on any server, a cloud server, any console 228, or any user device 130.

Such object data (e.g., the object file 216) may be associated with the content data (e.g., the media file 212 and/or the content time stamp file 214). In one example, the UGC server 232 stores and associates the content time stamp file 214 with the object file 216 based on a match between the streaming ID of the content time stamp file 214 and a corresponding activity ID of the object file 216. In another example, the object server 226 may store the object file 216 and may receive a query from the UGC server 232 for an object file 216. Such query may be executed by searching for an activity ID of an object file 216 that matches a streaming ID of a content time stamp file 214 transmitted with the query. In yet another example, a query of stored content time stamp files 214 may be executed by matching a start time and end time of a content time stamp file 214 with a start time and end time of a corresponding object file 216 transmitted with the query. Such object file 216 may also be associated with the matched content time stamp file 214 by the UGC server 232, though the association may be performed by any server, a cloud server, any console 228, or any user device 130. In another example, an object file 216 and a content time stamp file 214 may be associated by the console 228 during creation of each file 216, 214.

In exemplary embodiments, the media files 212 and activity files 216 may provide information to audio analytics server 140 regarding current session conditions, which may also be used as another basis for prioritizing different audio streams and for applying audio modifications thereto. Audio analytics server 140 may therefore use such media files 212 and activity files 216 to identify specific conditions of the current session, including currently speaking or noise-producing players, characters, and objects at specific locations and events. Based on such files 212 and 216, for example, audio analytics server 140 may identify a significance level of the in-game event (e.g., significant battles, proximity to breaking records), which may be used to prioritize the in-game audio over other audio streams and to apply audio modifications that allow the user to concentrate on the current session. Such session conditions may drive how the audio parameters of different audio streams may be prioritized, thereby resulting in whether audio modifications are applied and which audio modifications are applied to which audio parameters/streams.

Figure 3:
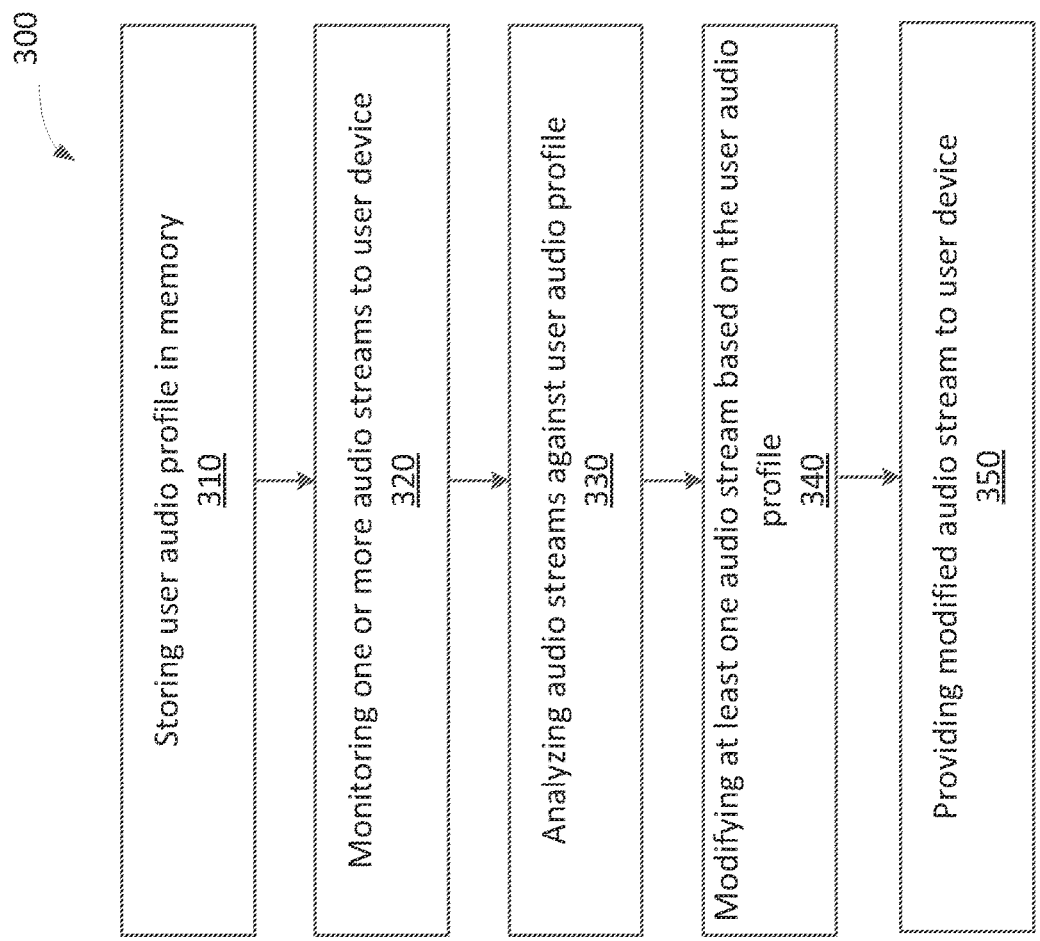
FIG. 3 is a flowchart illustrating an exemplary method for audio analytics and audio-based accessibility.

FIG. 3 is a flowchart illustrating an exemplary method 300 for audio analytics and audio-based accessibility. The method 300 of FIG. 3 may be embodied as executable instructions in a non-transitory computer readable storage medium including but not limited to a CD, DVD, or non-volatile memory such as a hard drive. The instructions of the storage medium may be executed by a processor (or processors) to cause various hardware components of a computing device hosting or otherwise accessing the storage medium to effectuate the method. The steps identified in FIG. 3 (and the order thereof) are exemplary and may include various alternatives, equivalents, or derivations thereof including but not limited to the order of execution of the same.

In step 310, a user audio profile may be stored in memory (e.g., databases 160). The user audio profile may include custom prioritization of different audio parameters and associated audio modifications. The different audio parameters may include any detectable characteristic of sound that may be provided to a user device of the user. In some embodiments, a new user may develop their user audio profile by specifying their personal preferences and priorities in relation to different sounds and streams. In some implementations, audio analytics server 140 may query the new user in order to identify how to generate the custom prioritization for the user audio profile. As discussed above, a different user audio profile may be stored for each user.

In step 320, one or more audio streams associated with the user device 150 may be monitored by audio analytics server 140. A user using user device 150 to stream and play digital content in a current session may be presented with an audio stream associated with the digital content. Where the digital content is a multiplayer game, another audio stream associated with voice chat functions may also include sounds and speech associated with other users. In some cases, other chat services (e.g., Discord server) may be used to provide yet another audio stream. The audio analytics server 140 may monitor all such audio streams (or any specific subset) based on the user audio profile of the user.

In step 330, the audio streams are analyzed by audio analytics server 140 against the user audio profile. In particular, the audio parameters specified by the user audio profile are identified within each of the audio streams and prioritized in accordance with the custom prioritization. For example, certain audio parameters may be favored or disfavored by the user, and their respective prioritization may reflect how the audio parameters should be modified. Different session conditions may also affect how much an audio parameter is favored or disfavored relative to other audio parameters associated with the user device 150.

In step 340, at least one audio stream associated with the user device 150 may be modified based on the user audio profile. Based on the analysis and prioritization performed n step 330, audio analytics server 140 may identify the associated audio modification and apply them to one or more of the audio streams and associated audio parameters. Audio parameters that are favored or more highly prioritized may be boosted or amplified, while audio parameters that are disfavored or less highly prioritized may be dampened, made transparent, or cancelled out in accordance with the associated audio modifications specified by the user audio profile.

In step 350, the modified audio stream(s) may be provided to user device 150 for play and presentation in real-time or close to real-time. The user of user device 150 may therefore be presented with audio stream(s) in which different audio parameters may have been emphasized or deemphasized in accordance with the custom prioritization specified by the user audio profile. The user may continue to specify refinements and other changes to the user audio profile over time, which allows for audio modifications to be applied to future audio streams in a manner that better reflects the user's preferences and priorities.

Figure 4:
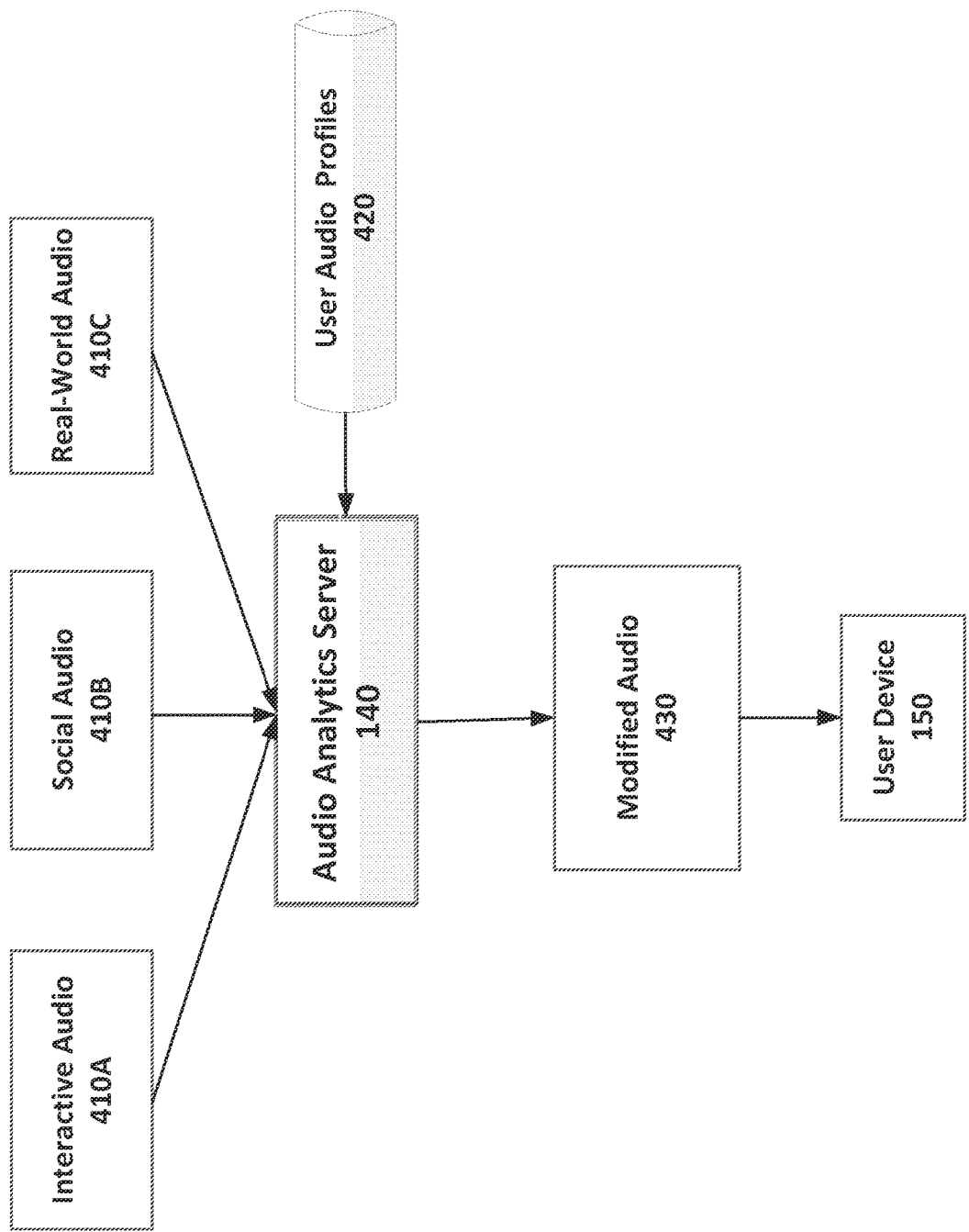
FIG. 4 is a diagram illustrating an exemplary implementation of audio analytics and audio-based accessibility functions.

FIG. 4 is a diagram illustrating an exemplary implementation of audio analytics and audio-based accessibility functions. As illustrated, different audio streams 410A-C may be associated with a current session of user device and provided to audio analytics server 140 for analysis and processing. Interactive audio stream 410A may be associated with an interactive content title and include audio associated with play of that interactive content title. Social audio stream 410B may be associated with a social chat service or platform and include audio associated with other users participating in the social chat session. Real-world audio 410C may be sounds occurring in the real-world environment of the user as captured by a microphone of user device 150 and provided to audio analytics server 140 for analysis and processing.

Audio analytics server 140 may obtain the user audio profile from one of the databases 160, which may include a specific database that stores user audio profiles 420. Using the user audio profile associated with the user of user device 150, audio analytics server 140 may analyze various audio parameters that occur concurrently across the different audio streams 410A-C. For example, in-game sounds from interactive audio stream 410A may be occurring concurrently with voice chat messages from social audio stream 410B, which may also be occurring concurrently with real-world sounds from real-world audio 410C. The different audio parameters may be identified and prioritized by audio analytics server in accordance with the custom prioritization specified by the user audio profile. The audio analytics server 140 may further identify what audio modifications are specified by the user audio profile in association with the prioritized audio parameters. The identified audio modifications may then be applied by audio analytics server 140 to generate one or more modified audio streams 430. The modified audio stream(s) 430 may then be provided to user device 150.

Figure 5:
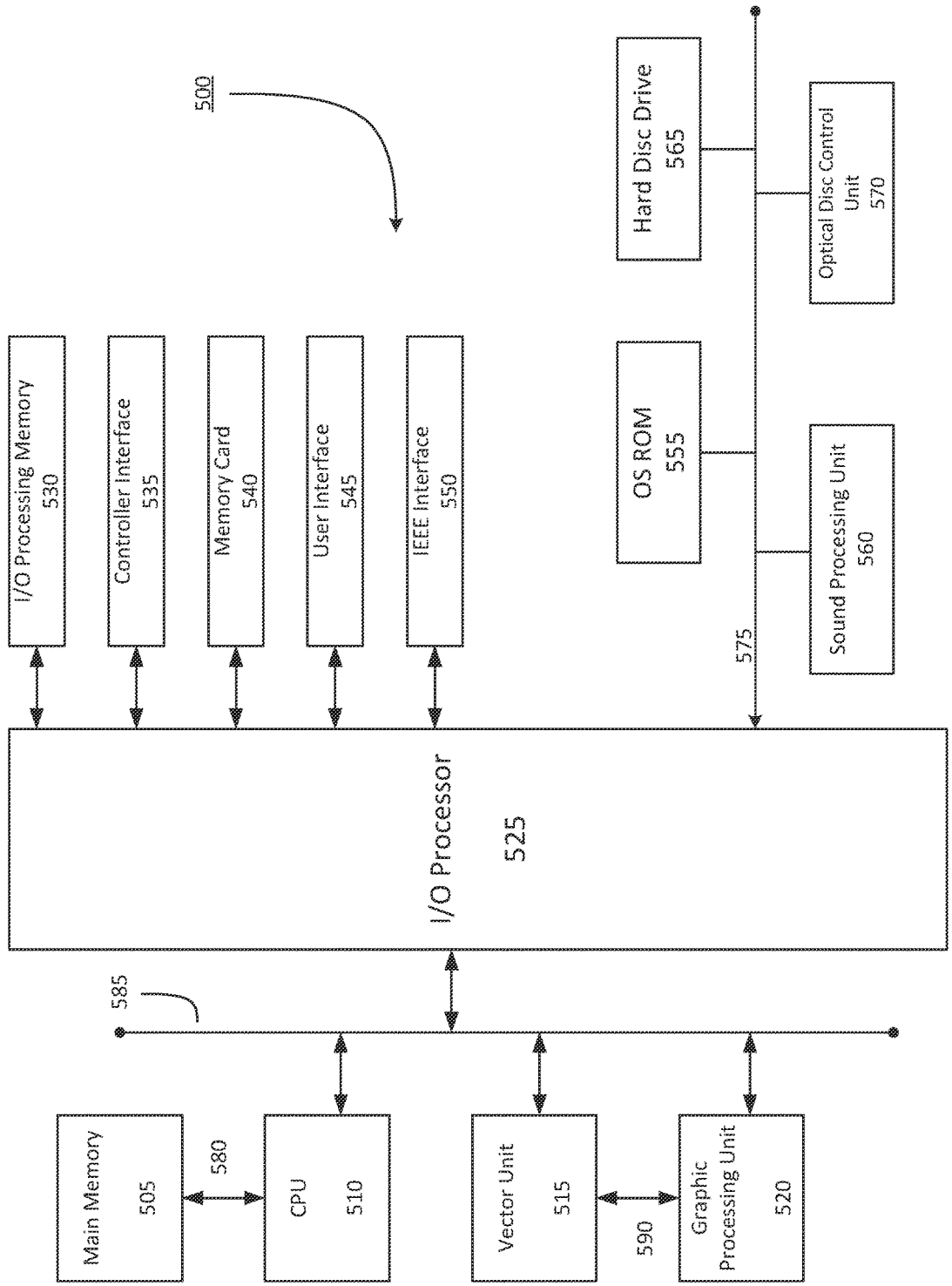
FIG. 5 is a block diagram of an exemplary electronic entertainment system that may be used in embodiments of the present invention.

FIG. 5 is a block diagram of an exemplary electronic entertainment system that may be used in embodiments of the present invention. The entertainment system 500 of FIG. 5 includes a main memory 505, a central processing unit (CPU) 510, vector unit 515, a graphics processing unit 520, an input/output (I/O) processor 525, an I/O processor memory 530, a controller interface 535, a memory card 540, a Universal Serial Bus (USB) interface 545, and an IEEE interface 550. The entertainment system 500 further includes an operating system read-only memory (OS ROM) 555, a sound processing unit 560, an optical disc control unit 570, and a hard disc drive 565, which are connected via a bus 575 to the I/O processor 525.

Entertainment system 500 may be an electronic game console. Alternatively, the entertainment system 500 may be implemented as a general-purpose computer, a set-top box, a hand-held game device, a tablet computing device, or a mobile computing device or phone. Entertainment systems may contain more or less operating components depending on a particular form factor, purpose, or design.

The CPU 510, the vector unit 515, the graphics processing unit 520, and the I/O processor 525 of FIG. 5 communicate via a system bus 585. Further, the CPU 510 of FIG. 5 communicates with the main memory 505 via a dedicated bus 580, while the vector unit 515 and the graphics processing unit 520 may communicate through a dedicated bus 590. The CPU 510 of FIG. 5 executes programs stored in the OS ROM 555 and the main memory 505. The main memory 505 of FIG. 5 may contain pre-stored programs and programs transferred through the I/O Processor 525 from a CD-ROM, DVD-ROM, or other optical disc (not shown)

using the optical disc control unit 570. I/O Processor 525 of FIG. 5 may also allow for the introduction of content transferred over a wireless or other communications network (e.g., 4$, LTE, 3G, and so forth). The I/O processor 525 of FIG. 5 primarily controls data exchanges between the various devices of the entertainment system 500 including the CPU 510, the vector unit 515, the graphics processing unit 520, and the controller interface 535.

The graphics processing unit 520 of FIG. 5 executes graphics instructions received from the CPU 510 and the vector unit 515 to produce images for display on a display device (not shown). For example, the vector unit 515 of FIG. 5 may transform objects from three-dimensional coordinates to two-dimensional coordinates, and send the two-dimensional coordinates to the graphics processing unit 520. Furthermore, the sound processing unit 560 executes instructions to produce sound signals that are outputted to an audio device such as speakers (not shown). Other devices may be connected to the entertainment system 500 via the USB interface 545, and the IEEE 1394 interface 550 such as wireless transceivers, which may also be embedded in the system 500 or as a part of some other component such as a processor.

A user of the entertainment system 500 of FIG. 5 provides instructions via the controller interface 535 to the CPU 510. For example, the user may instruct the CPU 510 to store certain game information on the memory card 540 or other non-transitory computer-readable storage media or instruct a character in a game to perform some specified action.

The present invention may be implemented in an application that may be operable by a variety of end user devices. For example, an end user device may be a personal computer, a home entertainment system (e.g., Sony PlayStation2® or Sony PlayStation3® or Sony PlayStation4®), a portable gaming device (e.g., Sony PSP® or Sony Vita®), or a home entertainment system of a different albeit inferior manufacturer. The present methodologies described herein are fully intended to be operable on a variety of devices. The present invention may also be implemented with cross-title neutrality wherein an embodiment of the present system may be utilized across a variety of titles from various publishers.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A method for audio analytics and audio-based accessibility, the method comprising:
storing a user audio profile in memory for a user, wherein the user audio profile includes a custom prioritization of one or more audio parameters associated with one or more audio modifications;
monitoring one or more audio streams associated with a user device of the user during a current session, wherein monitoring the audio streams is based on the user audio profile;
monitoring data regarding sound in a real-world environment associated with the user as captured by a microphone associated with the user device;
detecting that one or more of the audio parameters are present in the monitored audio streams, wherein detecting the detected audio parameters is further based on the sound in the real-world environment;
prioritizing the detected audio parameters based on the custom prioritization of the user audio profile; and
modifying a sound property of at least one of the audio streams in real-time based on the prioritization of the detected audio parameters, wherein the sound property of the at least one audio stream includes at least one of volume, speed, and frequency response relative to one or more other ones of the audio streams, and wherein modifying the sound property includes applying the audio modifications of the user audio profile to the at least one audio stream before the at least one audio stream is provided to the user device.

2. The method of claim 1, wherein monitoring the audio streams includes analyzing each of the audio streams to distinguish speech from other sounds, and wherein modifying the sound property includes boosting the sound property of the at least one audio stream that includes the speech relative to one or more other ones of the audio streams.

3. The method of claim 1, wherein the detected audio parameters include speech by a plurality of different users, and wherein the custom prioritization includes a prioritization order of one or more user groups.

4. The method of claim 1, wherein the sound in the real-world environment includes speech by the user, and wherein detecting that the audio parameters are present is based on identifying the speech by the user.

5. The method of claim 4, wherein the user audio profile further includes data regarding a voice of the user, and further comprising providing the at least one modified audio stream to one or more other user devices associated with the current session.

6. The method of claim 1, wherein the audio streams are associated with a plurality of different applications or platforms operating concurrently during the current session.

7. The method of claim 1, wherein the audio modifications include at least one of adjusting one of the audio parameters, dampening, adjusting transparency, and noise cancellation.

8. A system for audio analytics and audio-based accessibility, the system comprising:
memory that stores a user audio profile in memory for a user, wherein the user audio profile includes a custom prioritization of one or more audio parameters associated with one or more audio modifications;
a communication interface that communicates over a communication network, wherein the communication interface receives one or more audio streams associated with a user device of the user during a current session; and
a processor that executes instructions stored in memory, wherein the processor executes the instructions to:
monitor the audio streams based on the user audio profile;
monitor data regarding sound in a real-world environment associated with the user as captured by a microphone associated with the user device;
detect that one or more of the audio parameters are present in the monitored audio streams, wherein detecting the detected audio parameters is further based on the sound in the real-world environment;
prioritize the detected audio parameters based on the custom prioritization of the user audio profile; and
modify a sound property of at least one of the audio streams in real-time based on the prioritization of the detected audio parameters, wherein the sound property of the at least one audio stream includes at least one of volume, speed, and frequency response relative to one or more other ones of the audio streams, and wherein modifying the sound property includes applying the audio modifications of the user audio profile to the at least one audio stream before the at least one audio stream is provided to the user device.

9. The system of claim 8, wherein the processor monitors the audio streams by analyzing each of the audio streams to distinguish speech from other sounds, and wherein the processor modifies the sound property by boosting the sound property of the at least one audio stream that includes the speech relative to one or more other ones of the audio streams.

10. The system of claim 8, wherein the detected audio parameters include speech by a plurality of different users, and wherein the custom prioritization includes a prioritization order of one or more user groups.

11. The system of claim 8, wherein the sound in the real-world environment includes speech by the user, and wherein the processor detects that the audio parameters are present further based on identifying the speech by the user.

12. The system of claim 11, wherein the user audio profile further includes data regarding a voice of the user, and wherein the communication interface further provides the at least one modified audio stream to one or more other user devices associated with the current session.

13. The system of claim 8, wherein the audio streams are associated with a plurality of different applications or platforms operating concurrently during the current session.

14. The system of claim 8, wherein the audio modifications include at least one of adjusting one of the audio parameters, dampening, adjusting transparency, and noise cancellation.

15. A non-transitory, computer-readable storage medium, having embodied thereon a program executable by a processor to perform a method for audio analytics and audio-based accessibility, the method comprising:
storing a user audio profile in memory for a user, wherein the user audio profile includes a custom prioritization of one or more audio parameters associated with one or more audio modifications;
monitoring one or more audio streams associated with a user device of the user during a current session, wherein monitoring the audio streams is based on the user audio profile;
monitoring data regarding sound in a real-world environment associated with the user as captured by a microphone associated with the user device;
detecting that one or more of the audio parameters are present in the monitored audio streams, wherein detecting the detected audio parameters is further based on the sound in the real-world environment;
prioritizing the detected audio parameters based on the custom prioritization of the user audio profile; and
modifying a sound property of at least one of the audio streams in real-time based on the prioritization of the detected audio parameters, wherein the sound property of the at least one audio stream includes at least one of volume, speed, and frequency response relative to one or more other ones of the audio streams, and wherein modifying the sound property includes applying the audio modifications of the user audio profile to the at least one audio stream before the at least one audio stream is provided to the user device.

* * * * *